(12) United States Patent
Murray

(10) Patent No.: US 6,424,502 B1
(45) Date of Patent: Jul. 23, 2002

(54) ROLL-STABILIZED HEAD LIFTING APPARATUS AND METHOD FOR A DATA STORAGE DEVICE

(75) Inventor: S. Scott Murray, Fremont, CA (US)

(73) Assignee: Iomega Corporation, UT (US)

( * ) Notice: Subject to any disclaimer, the term of this patent is extended or adjusted under 35 U.S.C. 154(b) by 0 days.

(21) Appl. No.: 09/550,825

(22) Filed: Apr. 18, 2000

(51) Int. Cl.$^7$ .................................................. G11B 5/54
(52) U.S. Cl. ................................................... 360/254.8
(58) Field of Search ........................... 360/254.8, 254.7, 360/254.2, 254, 250, 255

(56) References Cited

U.S. PATENT DOCUMENTS

| | | | |
|---|---|---|---|
| 4,683,506 A | 7/1987 | Toldi et al. .................. 360/105 |
| 4,965,685 A | 10/1990 | Thompson et al. ...... 360/97.01 |
| 5,422,770 A | * 6/1995 | Alt ............................ 360/244.2 |
| 5,530,607 A | 6/1996 | Spendlove .................. 360/105 |
| 5,638,241 A | 6/1997 | Sonderegger ............... 360/133 |
| 6,032,352 A | * 3/2000 | Furay et al. ............. 29/603.03 |
| 6,226,154 B1 | * 5/2001 | Albrecht ................... 360/254.8 |

* cited by examiner

Primary Examiner—David Hudspeth
Assistant Examiner—Angel Castro
(74) Attorney, Agent, or Firm—Woodcock Washburn LLP

(57) ABSTRACT

A disk having a data storage medium for use with a disk drive having read/write heads for engagement with the data storage medium. An apparatus and method for roll-stabilized head lifting is disclosed for loading and unloading the read/write heads of the disk drive on to and off of the disk storage medium. The lifter device uses a sliding shelf that lifts the suspension from below thereby reducing roll during the loading and unloading operations and also helping to keep scraping debris off the suspension.

22 Claims, 12 Drawing Sheets

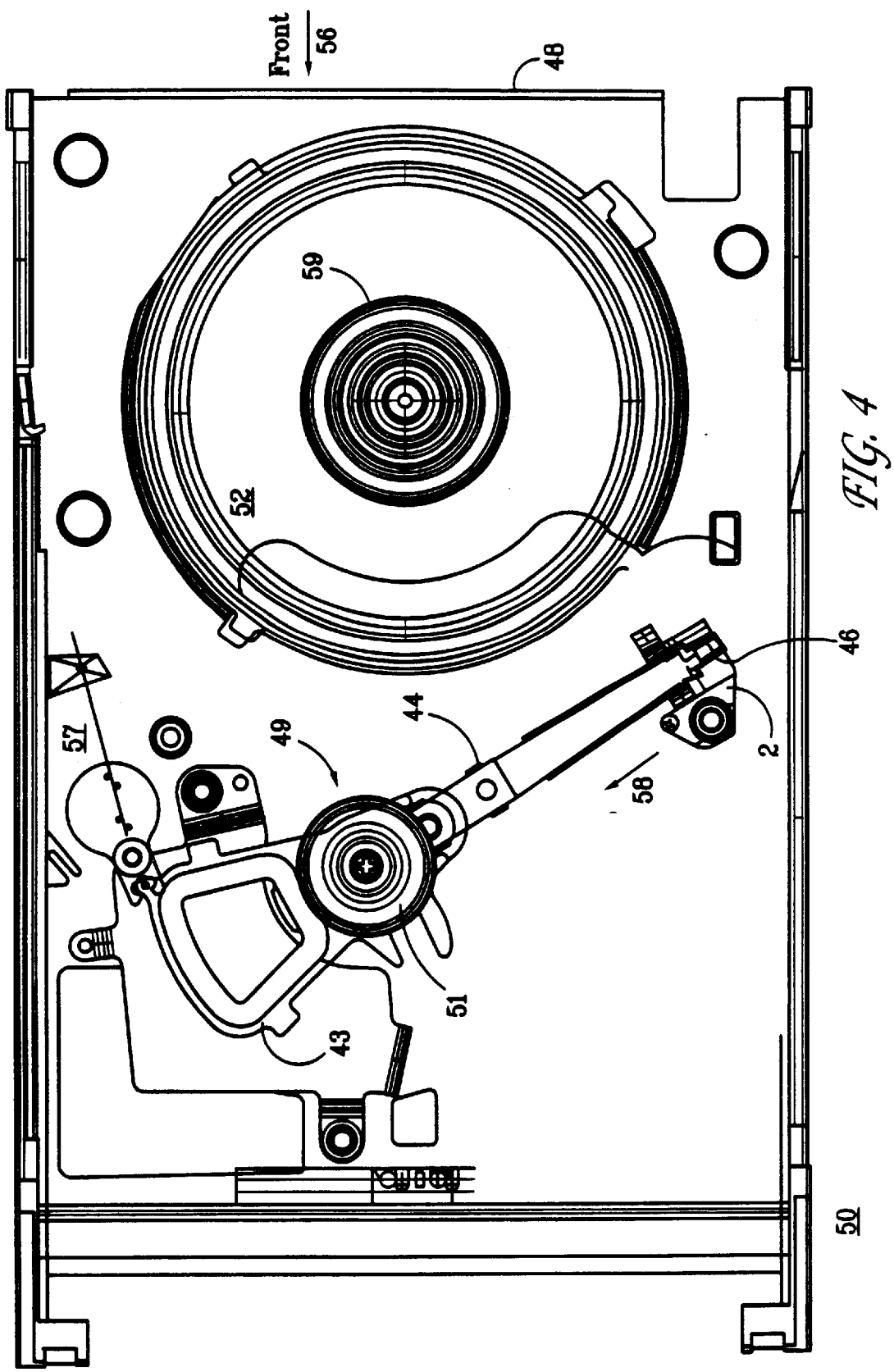

ROLL-STABILIZED HEAD LIFTING APPARATUS AND METHOD FOR A DATA STORAGE DEVICE

FIELD OF THE INVENTION

The present invention relates to data storage medium, such as disks and disk cartridges, for storing digital information. Particularly, this invention relates to an apparatus and method of lifting read/write heads of a disk drive on to and off of a surface of a data storage medium within the disk drive. More particularly, the invention relates to a roll-stabilized head lifter device with a sliding shelf to minimize roll during the loading and unloading of the read/write heads onto the data storage medium of a disk.

BACKGROUND

Removable disk cartridges for storing digital electronic information typically comprise an outer casing or shell that houses a disk-shaped magnetic, magneto-optical, or optical storage medium upon which information can be stored. The cartridge shell often comprises upper and lower halves that are joined together to house the disk. The disk is mounted on a hub that rotates freely within the cartridge. When the cartridge is inserted into a disk drive, a spindle motor in the drive engages the disk hub in order to rotate the disk within the cartridge at a given speed. The outer shell of the cartridge typically has an opening near one edge to provide the recording heads of the drive with access to the disk. A shutter or door mechanism is often provided to cover the head access opening when the cartridge is not in use to prevent dust or other contaminants from entering the cartridge and settling on the recording surface of the disk.

Disk drives for use with such removable disk cartridges or cartridgeless disks typically employ either a linear actuator mechanism or a radial arm actuator mechanism for positioning the read/write head(s) of the disk drive on the recording surface(s) of the storage medium, or disk. Because the disks are designed to be removable from the drive, the linear or radial arm actuators must be able to move off, and away from, the storage medium to a retracted position in order to prevent damage to the head(s) when a disk is inserted or removed from the disk drive.

Many removable disk drives employ a pair of opposing read/write heads for recording and reproducing information on both sides of a storage medium. Typically, the opposing heads are disposed on flexible suspension arms at the distal end of an actuator that allow the heads to fly closely over the respective surfaces of the rotating disk. The opposing heads must be spread apart as they approach the edge of the disk during a head loading operation in order to avoid collision with the edge of the disk. Similarly, when the heads are unloaded from the disk, they must again be spread apart to avoid collision with the edge of the disk and each other.

One type of mechanism for controlling the loading and unloading of heads in connection with a linear actuator mechanism is through the use of wings that are attached to the heads and that act to control the vertical position of the heads, as disclosed in U.S. Pat. No. 5,530,607 (Spendlove). The wings are in close proximity to the heads to fully ensure that the motion of the wing corresponds to the motion of the heads. The wings ride on opposed ramps fixedly disposed in the drive as the head of the linear actuator moves toward and away from the disk.

U.S. Pat. No. 4,965,685 (Thompson et al.) discloses a head loading mechanism for use with a radial arm voice coil actuator. The radial arm actuator comprises a bifurcated actuator arm that has upper and lower suspension arms mounted at its distal end. Magnetic heads are mounted on the ends of the respective suspension arms. The head loading mechanism of Thompson et al. includes an elongate head load arm that is pivotally mounted within the disk drive. Ramped prongs are formed at the distal end of the head load arm. When the disk drive is not in use, the suspension arms are separated by, and rest upon, the ramped prongs. When a disk is inserted into the disk drive, the actuator arm moves toward the disk surface causing the suspension arms to move down the ramped prongs and onto the recording surfaces of the storage medium.

U.S. Pat. No. 4,683,506 (Toldi et al.) discloses a mechanism for separating a pair of opposing read/write heads during disk insertion and for subsequently bringing the heads together onto the surface of a storage medium. Like other prior art mechanisms, this mechanism is also mounted in the disk drive.

U.S. Pat. No. 5,638,241 (Sonderegger) discloses a disk cartridge comprising a disk-shaped storage medium and an outer casing that houses the storage medium. The outer casing has a head access opening for providing access by the read/write heads of a disk drive to the disk-shaped storage medium within the casing. Head loading/unloading ramps are provided in the cartridge proximate the head access opening for loading and unloading the read/write heads of the disk drive to and from the storage medium. The head loading/unloading ramps comprise first opposed ramps that separate the read/write heads as they approach the storage medium within the casing, and second opposed ramps that bring the heads together for loading onto the storage medium in a controlled manner. Placement of the ramps within the cartridge allows the movement of the read/write heads to be more accurately controlled in relation to the vertical position of the storage medium.

However, these traditional ramping methods of carrying the suspension onto and off of the surface of the data storage medium tend to tilt the suspension in roll. In addition, torque is applied to the slider during the lifting and loading process due to the fact that traditional suspensions make contact with the ramp sliding surface. This roll of the suspension creates the potential of the heads damaging the surface of the storage medium. Traditional suspensions also twist as they travel on the ramp and scrap along the surface of the ramp. This scraping of the suspensions along the ramp surface results in scraping debris that may affect the operation and performance of the disk drive. Mechanical clearances are also very tight in this area of the disk drive and disk. These traditional ramp-type lifting devices accomplish the head lifting process by means of the suspension sliding on a ramp surface. This requires that the ramps be located in close proximity to the heads at the end of the suspensions where tolerances are already very tight. This results in tight mechanical tolerances in these traditional configurations.

SUMMARY

The present invention is directed to a method and apparatus for roll stabilized head lifting for improving the loading and unloading of read/write heads onto a surface of a data storage medium for data recording/reading, wherein a lifter device uses a sliding shelf to reduce roll during the load/unload operation. The apparatus of the present invention lifts the suspension from below such that roll is not introduced at the air bearing of the recording head, thereby reducing the chance of disk damage during head loading and unloading operations.

According to one aspect of the present invention, a head lifter device is disclosed for lifting the read/write head of a disk drive into and out of engagement with a data storage medium of a disk comprising a ramp structure disposed proximate the peripheral of the data storage disk and a carriage assembly in sliding contact with the ramp structure. The carriage assembly has a sliding shelf portion that lifts the read/write head in such a manner so as to minimize roll as it lifts the suspension. This is accomplished by maintaining a plane defined by the flat shelf section substantially parallel to a plane defined by the surface of the disk.

The flat shelf section of the sliding shelf portion carries the heads into and out of engagement with the surface of disk. The suspensions are lifted from the disk from below by the flat shelves such that there is substantially no roll at the interface of the heads and the surface of disk and no rubbing action between flat shelves and suspensions. The flat shelves are carried up lifting ramps to create a lifting process that produces approximately no twist on the suspensions. This results in nominally zero roll torque applied to the head sliders during the lifting and loading processes.

In accordance with a further aspect of the invention, the head lifter device further comprises a pair of opposed sliding shelf portions disposed on opposite sides of the disk, each of the sliding shelf portions lifts a corresponding head from engagement with opposing surfaces of the disk while maintaining a plane defined by the flat shelf section substantially parallel to a plane defined by the surface of the disk.

In accordance with a further aspect of the invention, each of the sliding shelf portions further comprises a flat shelf section proximate a first end of the sliding shelf portion, at least one pin proximate a second end, and a sliding body section that are disposed between and connects the flat shelf section to the pin.

In accordance with a further aspect of the invention, a means of positioning the sliding shelf portions in sliding contact with the ramp structure comprises at least one spring disposed between and connecting each of the opposed sliding shelf portions. The spring is coupled to at least one hole in each of the sliding body sections, and the spring acts to position the identical sliding shelves oriented in opposite directions in sliding contact with the ramp structure. The spring also acts to lower the sliding shelf portions down the ramp structure.

In accordance with a further aspect of the invention, the ramp structure further comprises an inverted L-shaped body having a support leg and a ramp leg. A sliding shelf ramp is disposed on the ramp leg and the sliding shelf ramp is in sliding contact with the sliding shelf portion. A closer pin ramp is disposed on the ramp leg and the closer pin ramp is in sliding contact with the pin of the sliding shelf portion. In a preferred embodiment, the closer pin ramp is substantially coplanar to the sliding shelf ramp. The ramp structure preferably further comprises a pair of opposing sliding shelf ramps and a pair of opposing closer pin ramps.

In accordance with a further aspect of the invention, the sliding shelf portion further comprises a recess that engages a stop disposed at the bottom of the lifting ramp to limit the travel of the sliding shelf potion in a direction toward the bottom of the lifting ramp.

In a further embodiment within the scope of the present invention, a system for lifting a read/write head of a disk drive onto or off of a disk medium is disclosed. The system includes a disk drive enclosure, an actuator disposed in the disk drive having an actuator arm, a suspension coupled to the actuator arm, a read/write head coupled to the suspension, and a head lifter device including a carriage assembly and a ramp structure. The carriage assembly acts to lift the suspension of the drive while maintaining a plane defined by the flat shelf section substantially parallel to a plane defined by the surface of the disk. In this manner, the suspensions are lifted from below by the flat shelf section in a direction having a vertical component that is substantially perpendicular to the surface of the disk. The carriage assembly slides on the ramp structure thereby lifting the read/write head into or out of engagement with the disk medium with substantially no roll.

In a further embodiment within the scope of the present invention, a method for lifting read/write heads of a disk drive into or out of engagement with a data storage medium is disclosed, comprising the steps of: providing a disk drive actuator disposed in the disk drive having an actuator arm, a suspension coupled to the actuator arm, and a read/write head coupled to the suspension; coupling a ramp structure to the inside floor of the disk drive enclosure; placing a carriage assembly in sliding contact with the ramp structure; lifting the suspension on the actuator with the carriage assembly while maintaining a plane defined by the flat shelf section substantially parallel to a plane defined by the surface of the disk; sliding the carriage assembly up the ramp thereby moving the read/write head away from a disk surface, or alternatively, sliding the carriage assembly down the ramp thereby moving the read/write head toward the disk surface.

In a further embodiment within the scope of the present invention, the lifter lifts the suspension from below in order to reduce the scrapping action of the suspension as it travels over the ramp surface. This help keep particulate debris off the head/gimbal assembly and improves performance and reliability. The use of this lifter device also allows the use of lift suspensions which would normally not work well with a traditional ramp loader.

In a further embodiment within the scope of the present invention, an improved lifting device lifts the read/write heads of the drive onto the disk medium, wherein the lifter device is placed partly up the suspension away form the head slider, between the actuator arm and the head slider. This improves the mechanical clearances within the disk drive.

BRIEF DESCRIPTION OF THE DRAWINGS

The foregoing summary, as well as the following detailed description of the invention, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 4 is a top plan view of the disk drive of FIG. 3, with the upper casing removed for clarity;

DETAILED DESCRIPTION OF THE PREFERRED EMBODIMENTS

Figure 1A:
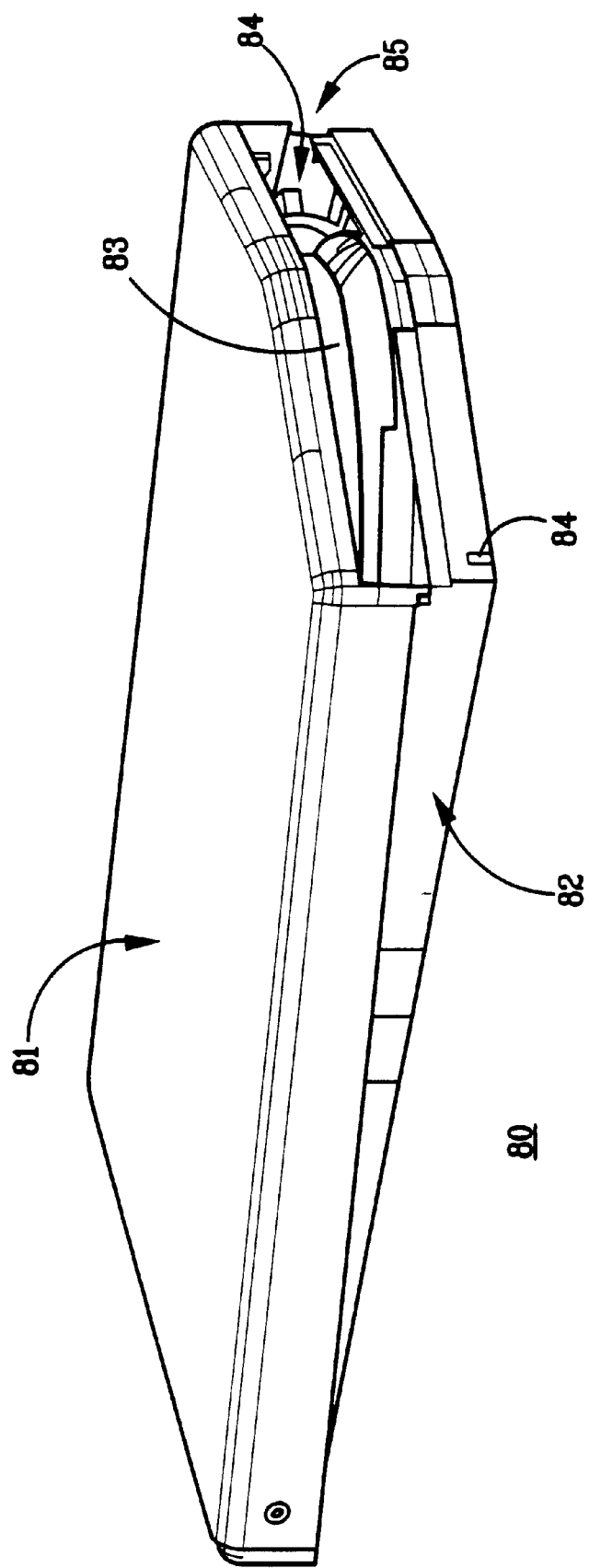
FIG. 1A shows a data recording cartridge according to one aspect of the present invention, with the shells in the open position.

Throughout the following detailed description similar reference numbers refer to similar elements in all the figures of the drawings. With reference to FIG. 1 through FIG. 11, shown is an exemplary roll-stabilized head lifting apparatus and method for use in a disk drive or disk cartridge including a carriage assembly and a ramp structure in accordance with the present invention. Preferably, this roll-stabilized head lifting assembly is mechanically attached to the inside floor of a disk drive enclosure, or alternatively the disk cartridge, and provides a method for minimizing head roll during the head loading and unloading operation. The lifter assembly is generally indicated by the reference character 2.

Figure 1B:
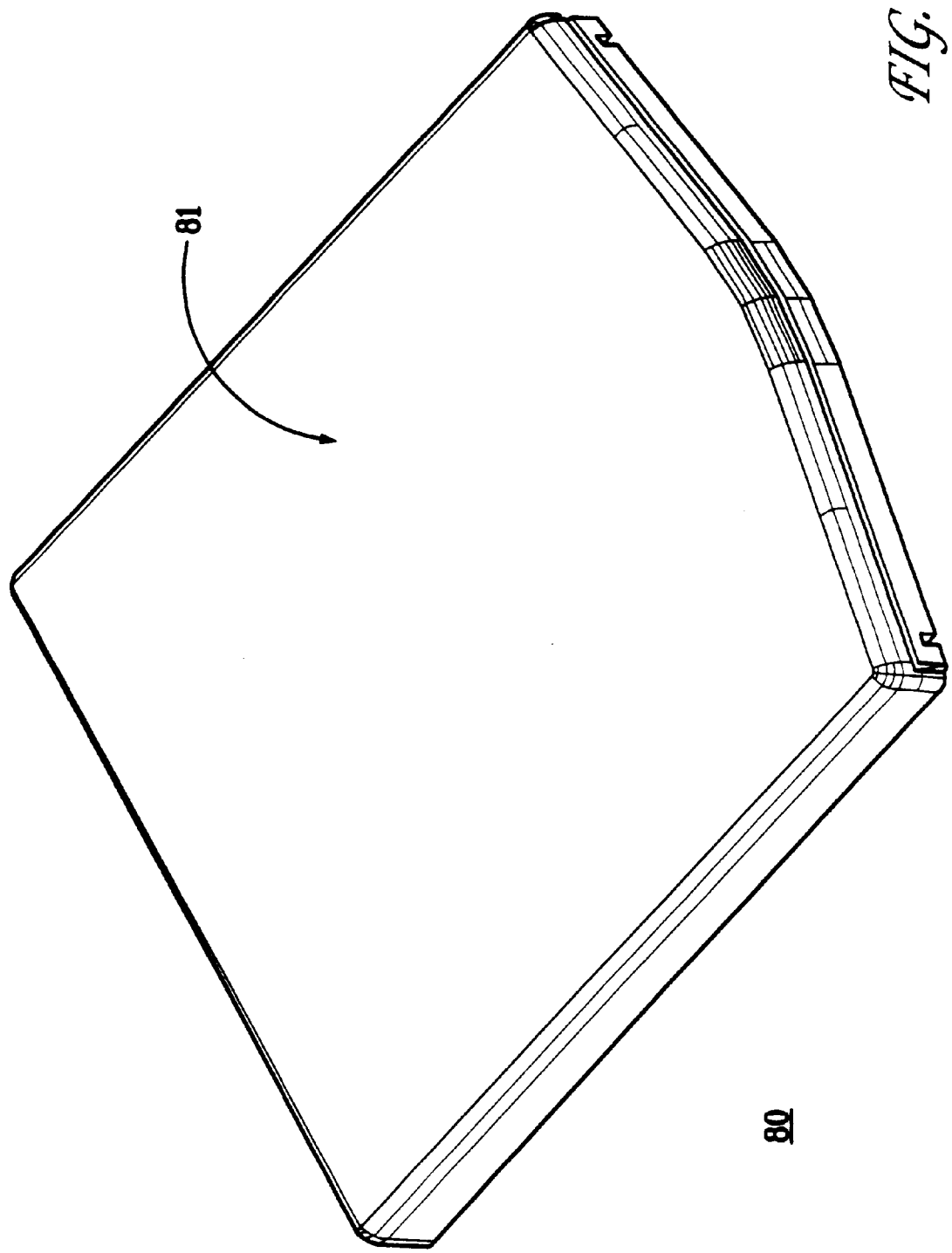
FIG. 1B shows a perspective view of the data recording cartridge of FIG. 1A with the shells in the closed position.

FIGS. 1A, 1B, 2A, and 2B show a first exemplary data storage medium and disk drive for use with the present invention. FIG. 1A shows a drive cartridge 80 that illustrates an embodiment of one aspect of the present invention. Drive cartridge 80 has a top shell 81, a bottom shell 82, recording medium 83, a seal assembly (not shown) and two latch assemblies 84. The recording medium 83 is disposed between top shell 81 and bottom shell 82. The top shell 81 and bottom shell 82 mutually pivot about hinge assemblies (not shown) to an open position to form a drive head opening 85. The top shell 81 and bottom shell 82 also pivot to form a closed position of the data recording cartridge 80, as shown in FIG. 1B.

Figure 2A:
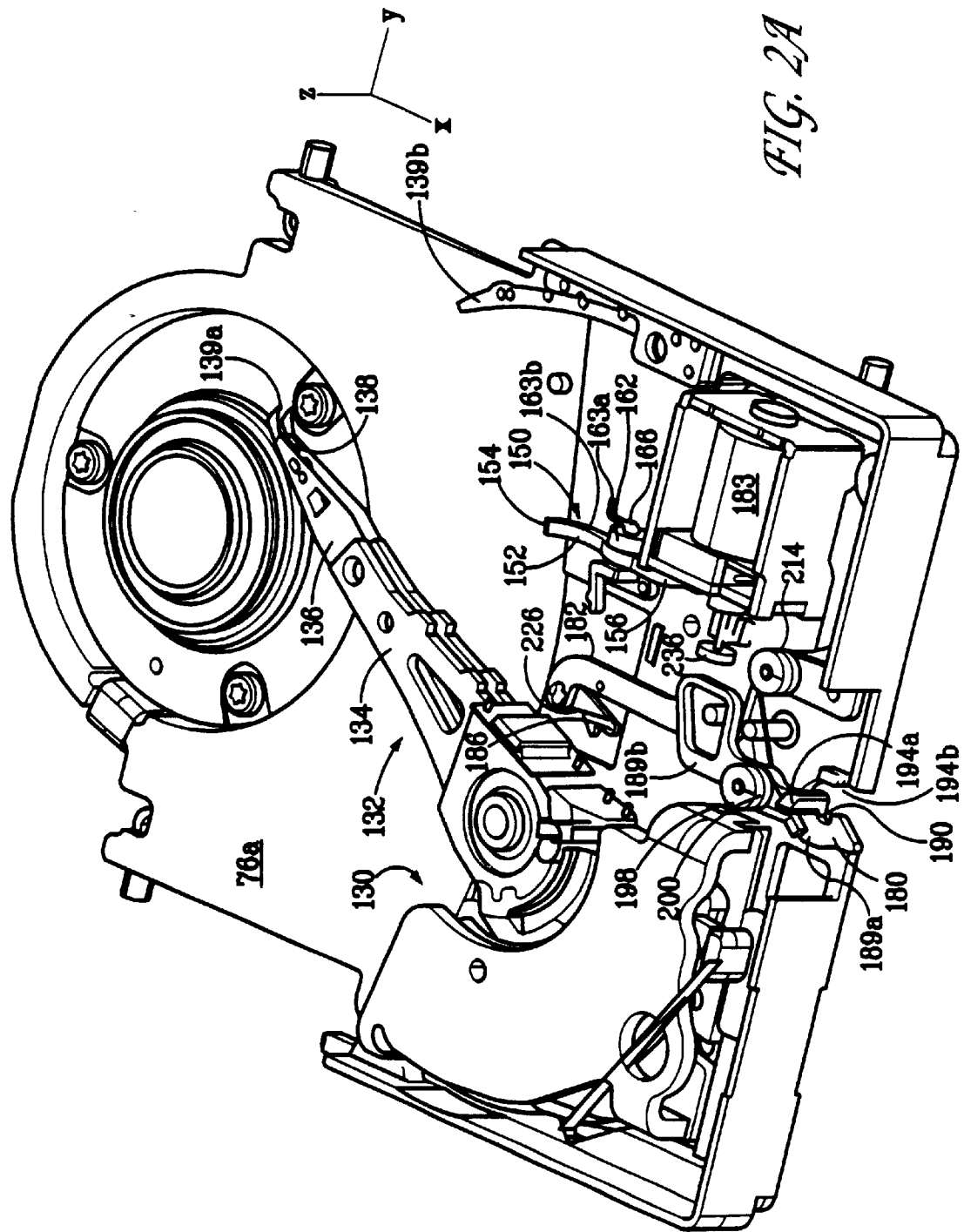
FIG. 2A shows a perspective view of the platform of the data recording cartridge of FIG. 1A, including aspects of the actuator mechanism, with the top shell removed for clarity.

FIG. 2A shows a rotary actuator 130 having a suspension assembly 132 extending therefrom. The suspension assembly includes a pair of structural arms 134, a pair of suspension arms 136 extending distally from the structural arms 134, and a pair of read/write heads 138 disposed near the distal end of the suspension arms 134.

FIG. 2A shows a rest state of the platform and actuator latch system in which actuator 130 is extended toward an operational position in which heads 138 may engage a data storage medium (not shown). During the rest state, in which a solenoid 183 extends disk 236 to its fully extended position, actuator latch spring 214 urges actuator latch member 182 in a counterclockwise direction (with respect to FIG. 2A) until block contacts an inboard surface of disk 236. Also, spring 200 biases platform latch member 180 counterclockwise toward the platform latched position. Solenoid 183 may be disposed in its rest position while rotary actuator 130 is in its latched position and also while the rotary actuator is engaging the disk. Solenoid 183 actuates to unlatch actuator latch 182 or platform latch 180.

Referring to FIG. 2A in which the rotary actuator 130 is in an operating condition to enable the heads 138 to engage the disk (not shown), the voice coil motor may drive actuator 130 clockwise in response (for example) to a signal to eject the cartridge or turn off the drive. Actuator 130 pivots until the lifting tab 139a on the distal end of suspension arm 136 rides up on the load ramp 139b, as explained in co-pending patent application, "COMBINATION LOAD RAMP AND UNLATCHING MECHANISM FOR A REMOVABLE DISK CARTRIDGE", Ser. No. 09/368,634, which is incorporated herein by reference in its entirety.

Figure 2B:
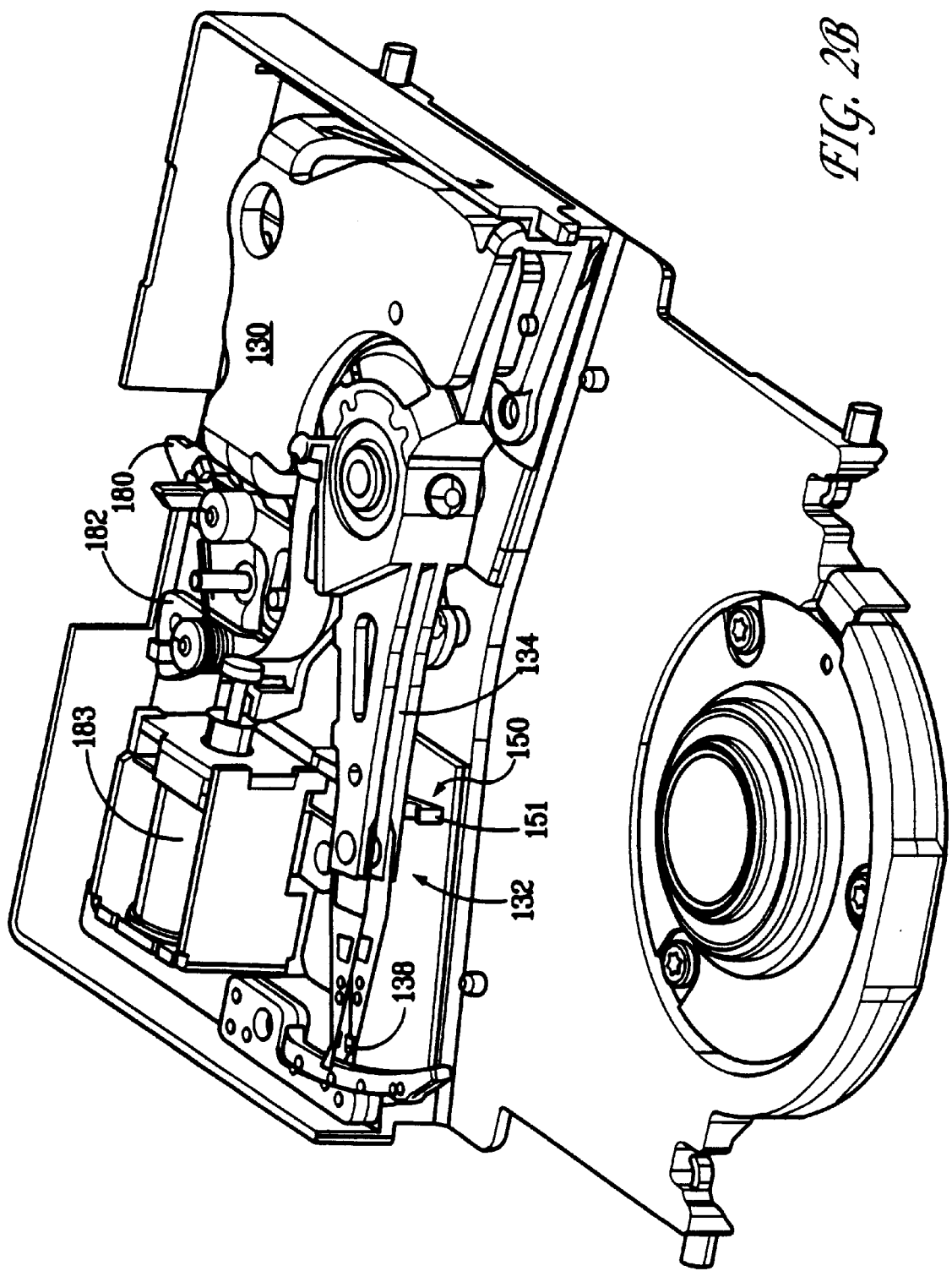
FIG. 2B is another perspective view of the platform of FIG. 2A with the actuator in a parked position.

FIG. 2B shows the actuator 130 in a retracted or parked position on the load ramp 139b. The above drive, cartridge, and actuator mechanism are described in "A SHUTTERLESS DATA RECORDING CARTRIDGE AND DRIVE FOR USING SAME", Ser. No. 08/835,437, filed Apr. 9, 1997, which is incorporated herein by reference.

Figure 3:
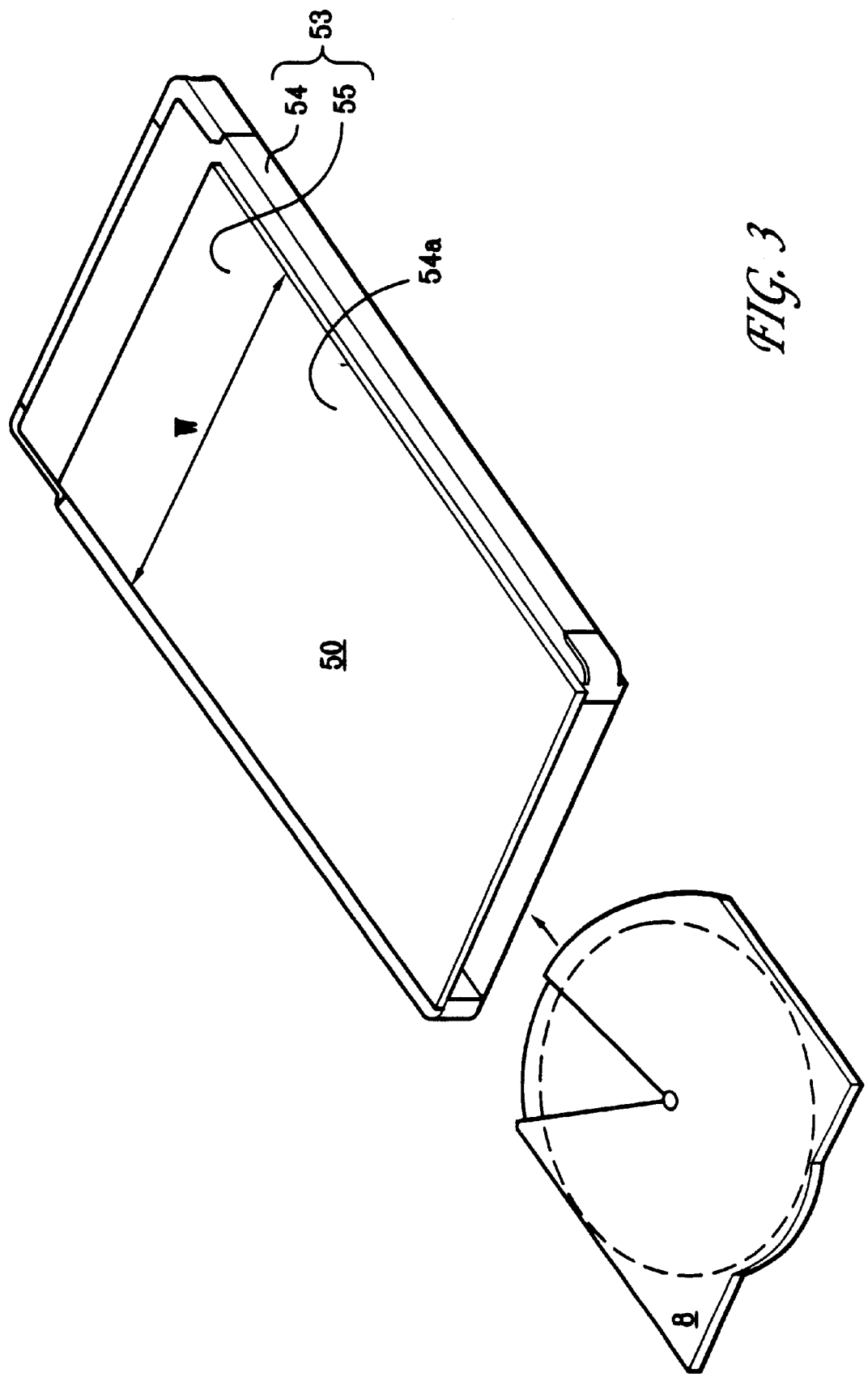
FIG. 3 is a perspective view of a second exemplary data storage device and a second exemplary disk drive in which the present invention can be embodied.
Figure 5A:
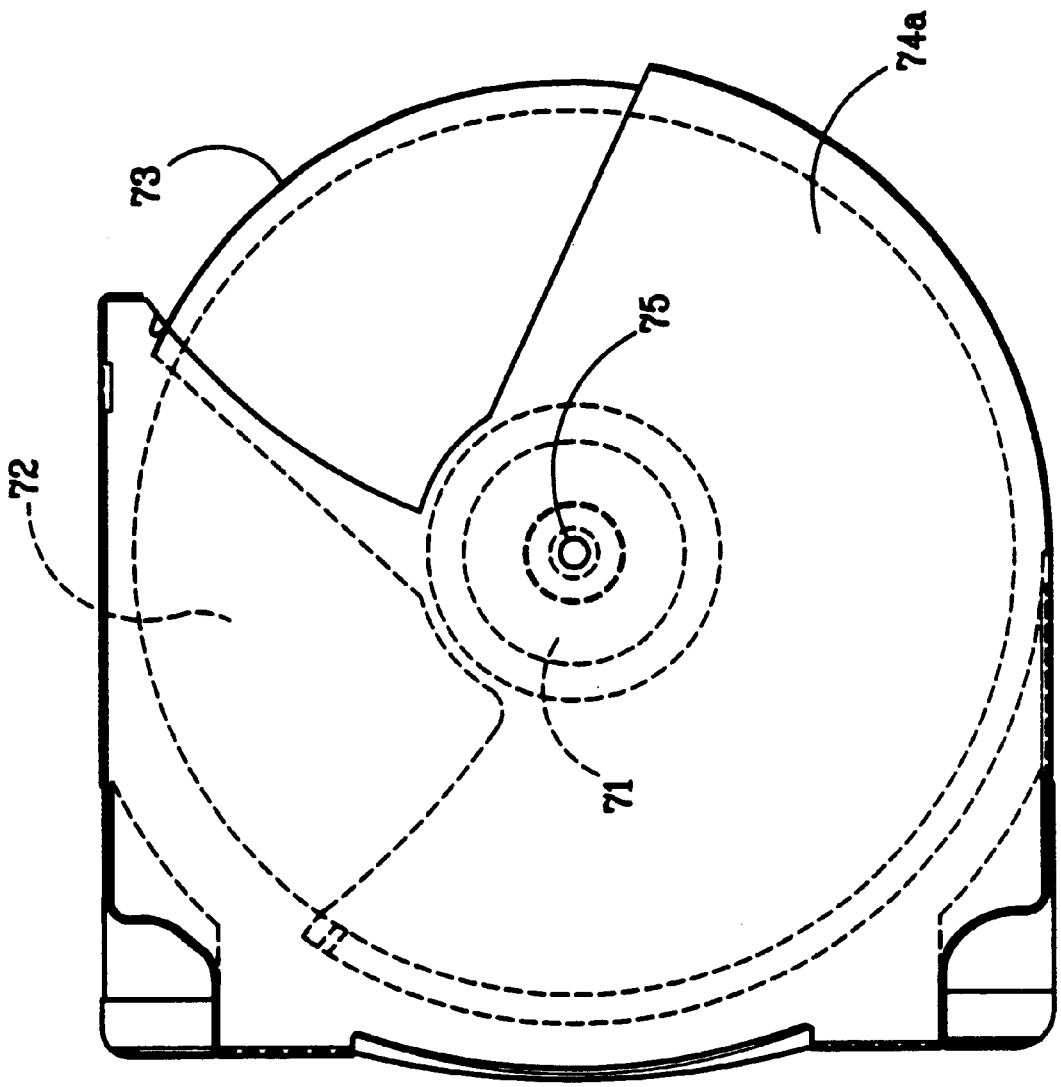
FIGS. 5A and 5B are top and bottom views of the data storage device of FIG. 3 for use in the drive of FIG. 4.
Figure 5B:
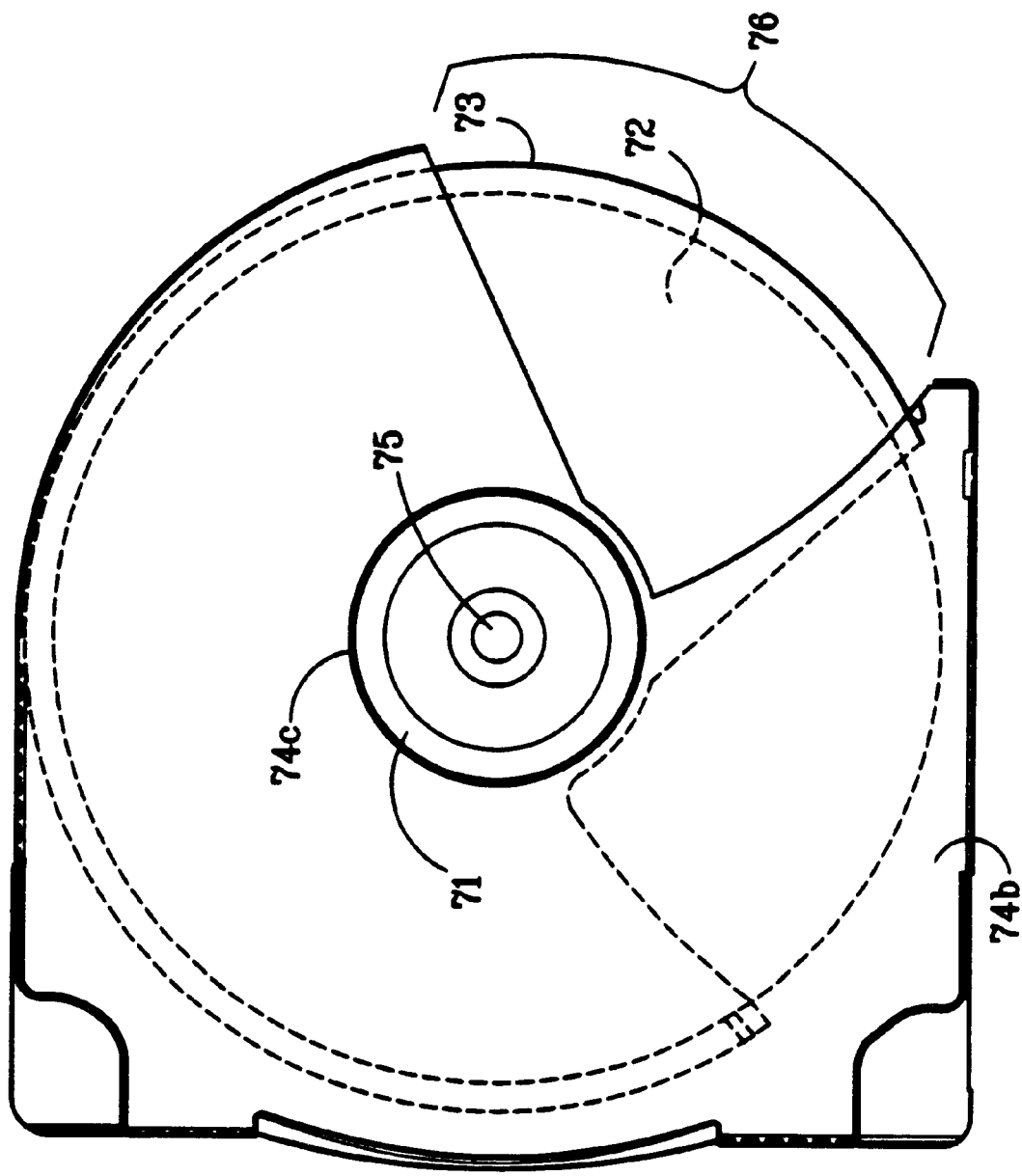

FIG. 3 is a perspective drawing of a second exemplary disk drive device 50 and a disk 8. Drive 50 may be adapted for removable connection to a computer device or may be built-in to a computer device (not shown). Disk drive device 50 may have a protective case, such as protective case 53, consisting of an upper case 54 and a lower case 55, which form an interior space for accepting disk 8. Disk 8 may comprise a disk cartridge, as shown in FIGS. 3, 5A, and 5B. Alternatively disk 8 may comprise a cartridgeless media, such as an optical compact disk (CD). The disk 8 medium may be either a flexible medium or alternatively a hard medium. Upper case 54 and lower case 55 are preferably formed from sheet material. Lower case 55 has a bottom surface and side surfaces, and upper case 54 is formed so that it covers the top of lower case 54. Upper case 54 may also have a raised surface 54a, which projects upward across a width W of the upper case 54. Width W is sized accordingly such that space is available within case 53 to accommodate a disk 8 as well as a disk drive mechanism and an electronics system.

FIG. 4 is a top plan view of the internal components of the exemplary disk drive 50 of FIG. 3 with the upper case 54 removed for clarity. Drive 50 further comprises a chassis 57, an actuator 49, a spindle motor 52 and a spindle 59, and an exemplary lifter assembly 2 of the present invention. The actuator is itself comprised of three major components: (1) a pair of load beams 44 with (2) a read/write head 46 disposed at the distal end of each load beam 44, and (3) a coil 43. Actuator 49 is driven by a voice coil to pivots about point 51. When actuator 49 is not in use, it is generally retracted to the parked position (as shown).

A disk 8 can be inserted into an opening 48 in the front of drive 50 in the direction indicated by arrow 56. During insertion, the disk 8 slides linearly along the top surface of chassis 57 and spindle motor 52 for engagement with the read/write heads 46. The disk 8 may include either a cartridge or cartridgeless design, and the disk 8 medium may be either hard medium or alternatively a flexible medium.

FIGS. 5A and 5B present top and bottom views of an exemplary disk cartridge 8 for use with the drive 50. Disk cartridge 8 includes a data storage media 72, a storage media hub 71, top and bottom cartridge shell halves 74a and 74b, a rotary shutter 73, and a shutter pivot pin 75. Shutter 73 is rotatably disposed in cartridge 8 to selectively cover and expose disk access opening 76. In the open position, shutter 73 is rotated away from a generally wedge shaped disk access opening 76 that is formed in cartridge shell 74, exposing the top and bottom surfaces of media 72 for access by a read/write head or heads 46 contained within the disk drive 50. In the closed position, shutter 73 is rotated over disk access opening 76, sealing disk cartridge 8 and protecting media 72. The data storage media 72 is preferably formed of a thin polymer film, such as MYLAR, and has a thin magnetic layer uniformly dispersed on the top and bottom surfaces. The magnetic surfaces magnetically sensitize the flexible storage media 72 and enable the storage of digital data when the surface is brought into magnetic communication with a magnetic transducer of the type commonly found in disk drives. Storage media 72 is generally circular with a circular hole proximate its center.

Media hub 71 is firmly secured to storage media 72, such that the center of hub 71 is aligned proximate the center of media 72. Media hub 71 is preferably attached to storage media 72 via a well-known adhesive process. The storage media and hub assembly are rotatably disposed between upper and lower cartridge shell halves 74a, 74b. Lower cartridge shell half 74b has a substantially circular spindle access opening 74c such that a disk drive 50 can provide rotational power to storage media 72 via hub 71.

Figure 6:
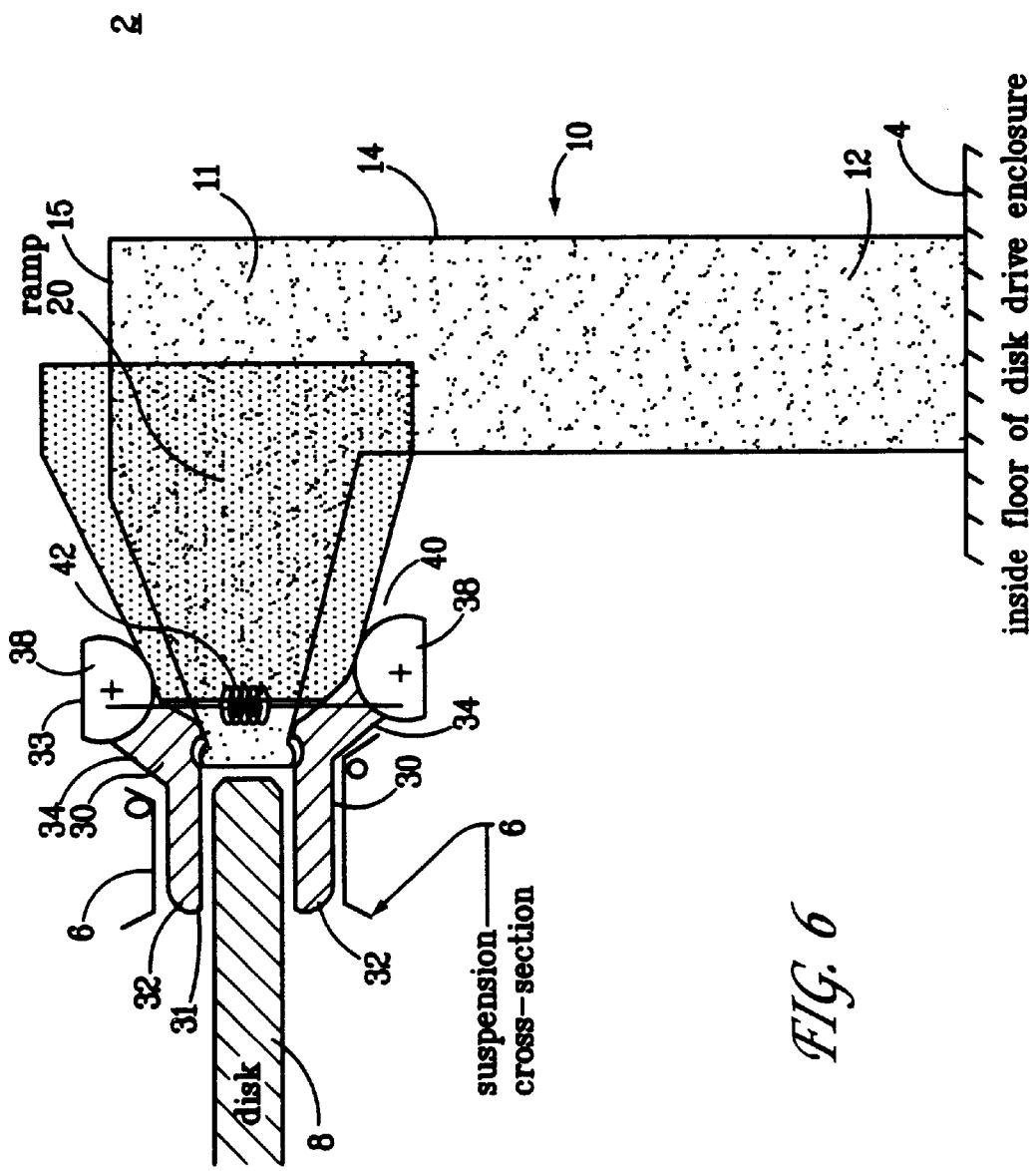
FIG. 6 is a side view of an exemplary head lifter device of the present invention.

Referring now to FIG. 6, an exemplary lifter assembly 2 in accordance with the present invention is depicted. FIG. 6 shows a side view of a lifter assembly 2 intended to lift or carry the heads 46 of the drive 50 into and out of engagement with the surface of the disk 8 by lifting suspensions 6 attached to opposing actuator arms 49 and heads 46 from a single disk 8. As the suspensions 6 pushes the carriage assembly 40 up lifting ramps 20, a soft spring 42 stretches. Spring 42 also allows carriage assembly 40 to follow suspensions 6 back down lifting ramps 20 when heads 46 are loaded back onto disk 8. As shown, the lifter assembly 2 includes a carriage assembly 40 that slidably engages a ramp structure 10. The ramp structure 10 of lifter assembly 2 is preferably mounted on the inside floor 4 of a disk drive enclosure 50, or alternatively can be coupled to the inside floor of a disk cartridge. The carriage assembly 40 is acted upon by the suspensions 6 of actuator arm 49.

Figure 7:
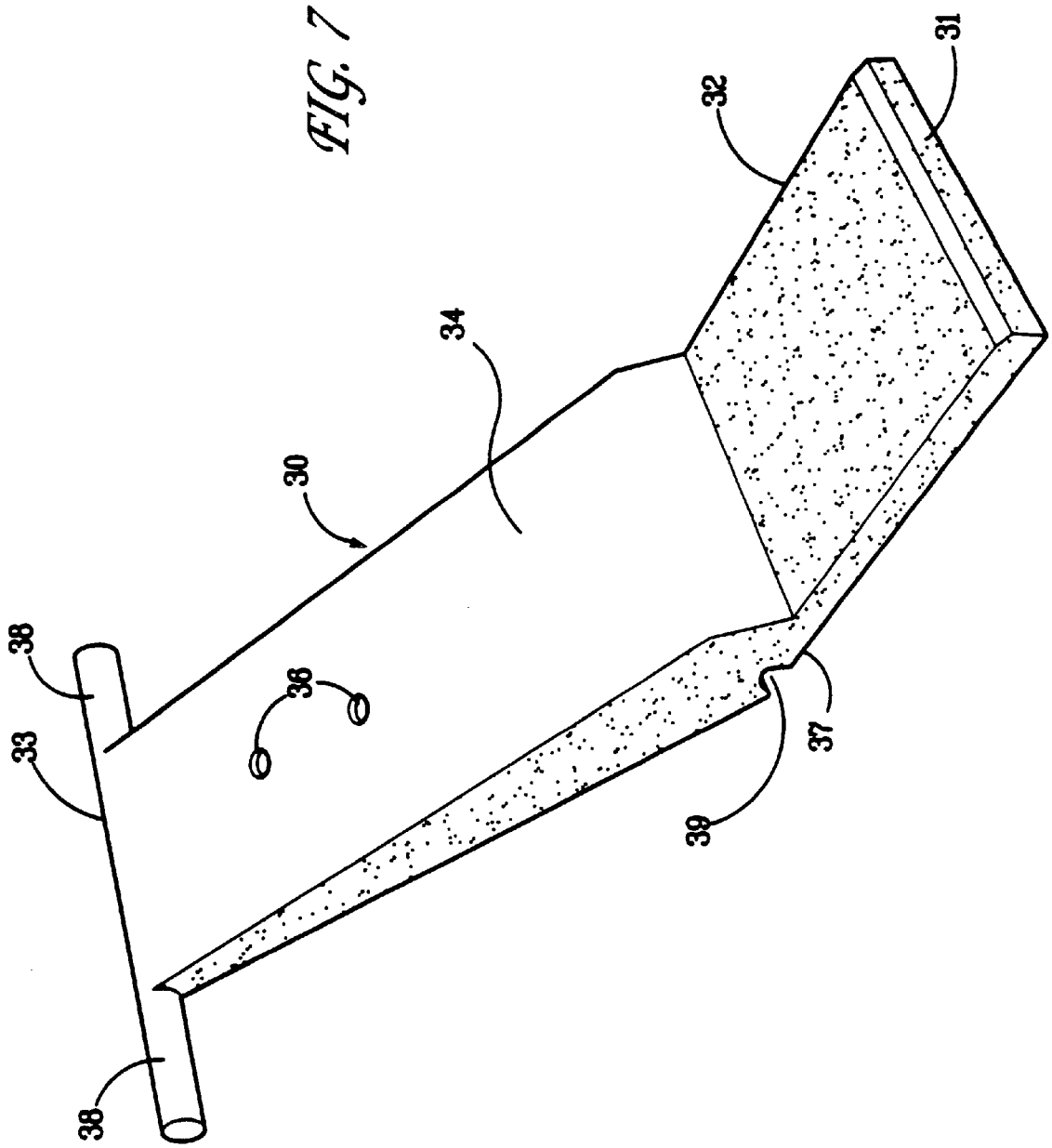
FIG. 7 is a perspective view of an exemplary sliding shelf portion of the head lifter device of FIG. 6.

As illustrated in FIG. 6 and FIG. 7, the carriage assembly 40 includes two opposing sliding shelf portions 30 and a retention device 42 for supporting and positioning the opposing sliding shelf portions 30 on ramp structure 10. Each sliding shelf portion 30 includes a flat shelf section 32 located at a first end 31 of sliding shelf portion 30, at least one pin 38 located at a second end 33 of sliding shelf portion 30, and a sliding body section 34 that is disposed between and connects flat shelf section 32 and pin 38. Sliding body section 34 also has at least one hole 36 defined therein. The sliding shelf portion 30 may be formed as one piece or it may be formed in sections and then assembled into one piece.

Preferably, the retention device 42 comprises at least one spring. The spring 42 is coupled to each opposed sliding shelf portion 30 by connecting one end of spring 42 to one hole 36 in sliding body section 34. Spring 42 functions to position opposing sliding shelf portions 30 in sliding contact with lifting ramps 20, and also acts to pull the opposing sliding shelf portions 30 back down lifting ramps 20 when the force of suspensions 6 is removed. The characteristics of spring 42 preferably allow the spring 42 to stretch thereby allowing suspensions 6 to push each sliding shelf portion 30 up lifter ramp 20 so that the heads 46 may clear the disk surface, and at the same time have the appropriate characteristics to allow spring 42 to contract thereby allowing carriage assembly 40 to follow suspensions 6 back down lifter ramps 20 when loading heads 46 back on the disk surface.

Alternatively, the retention device 42 for positioning opposing shelf portions 30 on ramp structure 10 can comprises any suitable device to hold and position the shelf portions 30 on ramp structure 10, including an elastic material, different types of springs, or any other material that allows some stretching and also has a memory to return to its original shape and dimensions.

Figure 11:
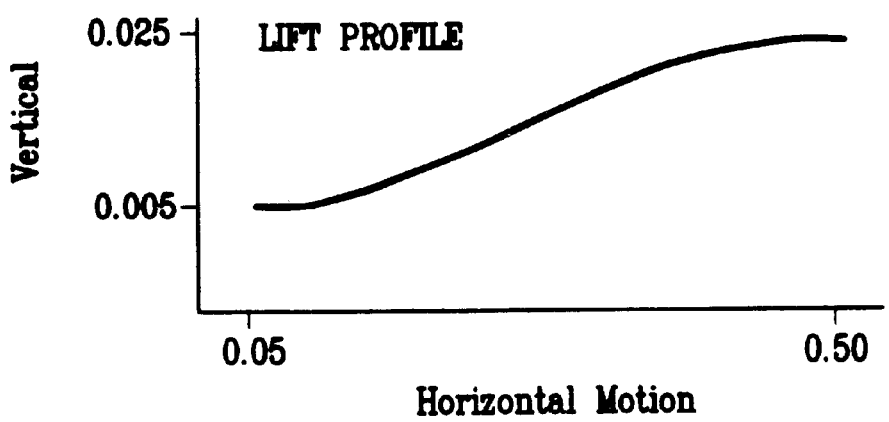
FIG. 11 is an exemplary lift profile of the lifter device of the present invention.

Referring to FIG. 6 and FIG. 11, each flat shelf section 32 makes contact with a corresponding suspension 6. The flat shelf section 32 acts to minimize roll as it lifts suspension 6 by maintaining a plane defined by the flat shelf section 32 substantially parallel to a plane defined by the surface of the disk 8. The flat shelf section 32 of the sliding shelf portion 30 carries the heads 46 into and out of engagement with the surface of disk 8. The suspensions 6 are lifted from the disk 8 by flat shelves 32 such that there is substantially no roll at the interface of the heads 42 and the surface of disk 8 and no rubbing action between flat shelves 32 and suspensions 6. Flat shelves 32 are carried up lifting ramps 23 to create a lifting process that produces approximately no twist on suspensions 6. This results in nominally zero roll torque applied to head sliders 46 during the lifting and loading processes.

In this manner, the suspensions 6 are lifted from below by the flat shelf section 32 in a direction having a vertical component that is substantially perpendicular to the surface of the disk 8. From below means that the flat shelf section 32 contacts the suspension 6 on the side of the suspension 6 closest to the disk surface 8. Accordingly, there is minimal movement between the flat shelf section 32 and the suspension 6 as the carriage assembly 40 is carried up or down the lifting ramps 20.

Figure 8:
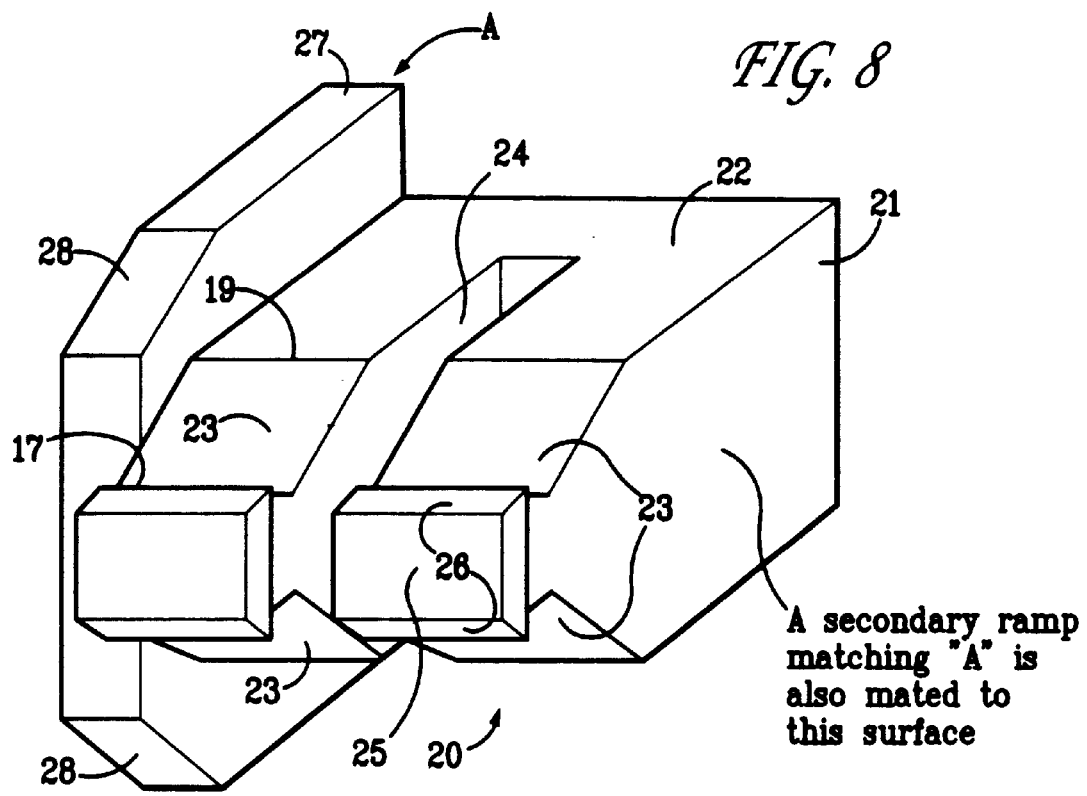
FIG. 8 is a perspective view of an exemplary ramp structure of the head lifter device of FIG. 6, with one side plate removed for clarity.

As shown in FIG. 6 through FIG. 8, pin 38 is designed to connectively slide over pin slides 28 of closer pin ramps 27. Pin 38 is designed of suitable material to reduce wear on pin 38 and also to reduce friction between pin 38 and the pin slide surface 28. Pin 38 may have a variety of shapes, but preferably is rounded where it slides over pin slide 28 of closer pin ramp 27. Pin 38 may be a single long pin or it may be two individual pins, and pin 38 may be formed integral with sliding body section 34 or coupled to the second end 33 of sliding body section 34.

Sliding body section 34 connects flat shelf section 32 to pin 38. Body section 34 has a sliding surface 37 in the area where flat shelf section 32 and body section 34 meet. Sliding surface 37 slidably engages the sliding shelf ramp 23. A recess 39 is also located in this area. Recess 39 acts to stop the movement of carriage assembly 40 at the bottom of lifter ramp 20. Body section 34 also has at least one hole 36 therein. Hole 36 is used to couple spring 42 to each opposed sliding shelf portion 30. Preferably one soft spring is used to position opposing sliding shelf portions 30 on lifter ramps 20. Alternatively, sliding shelf portions 30 may also be held in position and pulled back down the ramps by means secured at the bottom of lifter ramps 20 or by means secured at the top of lifter ramp 20 that pushes the carriage assembly 40 down the ramps 20.

Referring to FIG. 6, ramp structure 10 includes an inverted L-shaped body 11 having a support leg 14 and a ramp leg 15. Preferably, support leg 14 is attached at its bottom 12 to the inside floor 4 of a disk drive enclosure. Support leg 14 may alternatively be coupled to the inside floor of a disk cartridge. Support leg 14 must have sufficient stiffness to support ramp leg 15 and carriage assembly 40. Support leg 14 maybe formed integral with the floor 4 of the disk enclosure, but preferably is formed separately and then coupled to inside floor 4.

Figure 9:
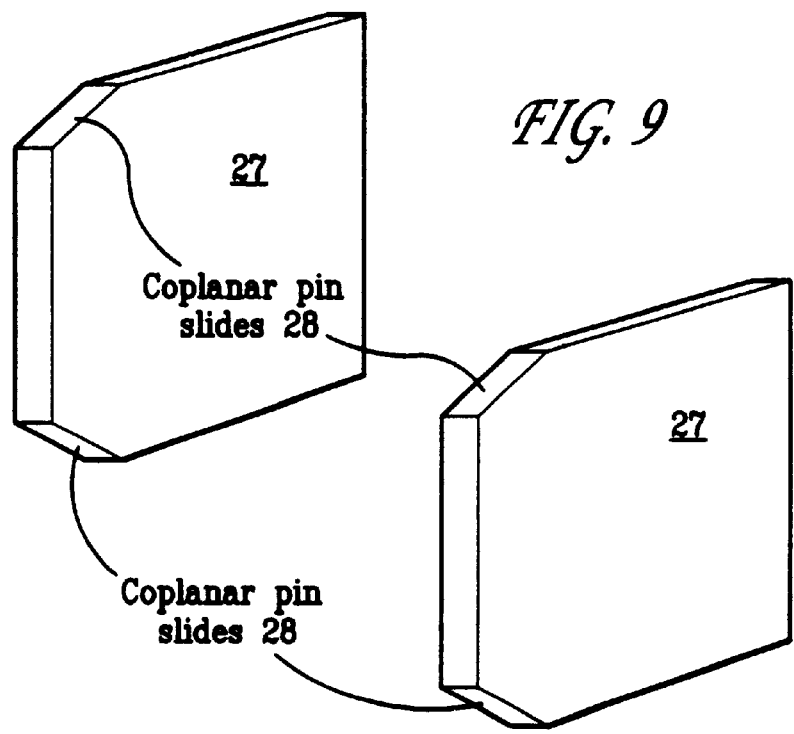
FIG. 9 is a side view of the lifter device of FIG. 6 showing an actuator and a data storage medium.

As shown in FIG. 8 and FIG. 9, ramp leg 15 includes lifter ramp 20 having two sets opposing ramps. The opposing ramps include sliding shelf ramps 23 and closer pin ramps 27. Lifter ramp 20 includes a central section 22 having a distal end 25 and two sides 21. Opposed sliding shelf ramps 23 are formed on the central section 22 at distal end 25. Each sliding shelf ramp 23 has a bottom 17 located at the distal end 25 of central section 22, and a top 19 located proximate the end of ramp leg 15 in the area where it attaches to support leg 14. Stops 26 are provided at the bottom 17 of ramp 23 to engage recess 39 on sliding shelf portion 30 to restrict the downward motion of sliding shelf portions 30 at the bottom 17 of sliding shelf ramp 23. In a preferred embodiment, a crevice 24 is located in the center of central section 22.

Crevice 24 is located in the center of central section 22 and vertically divides a portion of central section 22 from distal end 25 to a point pass the top 19 of sliding shelf ramp 23. Crevice 24 is open at distal end 25. Crevice 24 is provided to allow spring 42 to hold the opposing sliding shelf portions 30 on lifting ramp 20 centrally. Preferably, spring 42 runs vertically through crevice 24 and couples opposing sliding shelf portions together. In an embodiment where the positioning and tension mechanism is attached to the distal end 25 of lifter ramps 20, crevice 24 may not be needed.

FIGS. 8 and 9 show an exemplary embodiment wherein closer pin ramps 27 include two side-plate ramps having opposed closer pin slides 28 that preferably define a plane that is substantially parallel to a plane defined by the sliding shelf ramps 23. The two side-plate ramps are located on each side 21 of central section 22. The two side plates may be formed integral with central section 22 or they may be formed separately and then coupled to central section 22. The closer pin slides 28 of the side plates are in sliding contact with pins 38 on sliding shelf portions 30. Pin slides 28 are designed to allow pin 38 to freely slide over pin slides 28 and have an angle that is sufficient to allow the lifter shelf 30 to lift heads 46 off a disk 8 and to lower heads 46 onto a disk 8. Preferably, closer pin slides 28 and sliding shelf ramp 23 define planes that are parallel. Depending on the particular application and disk drive requirements, these ramps may have different angles of inclination (i.e., not parallel) to improve performance.

FIG. 11 shows an exemplary lift profile with the horizontal motion of the heads shown on the x-axis and the vertical lift of the heads shown on the y-axis. As can be appreciated, the lift profile has a vertical component (in the Z-dimension of the drive 50) and a horizontal component (in an axial or lateral dimension depending on the type of drive 50 and type of actuator 49). In one preferred embodiment, the lift profile would typically lift the recording head between 0.005 and 0.025 inches above the surface of a disk over a travel range between 0.05 and 0.50 inches. The vertical lift amount must be sufficient to ensure mechanical separation between the head and the disk during non-operational drive conditions, but not so large so as to deform the suspension such that the pre-load force between the actuator and the disk is noticeably reduced.

When a head 46 is lowered from the lifting mechanism 30 onto a disk 8, having substantially zero roll is advantageous, because it increases the likelihood of formation of a continuous air bearing without the head first striking the disk. Such strikes can cause damage associated with data loss, generation of particulate debris, and wear scars on the disk that can in some cases grow to become head crashes.

Avoiding particle generation on the metallic suspensions is also useful because such particles are sometimes shed into the disk surface, and have a risk of traveling to a location between the disk and the head. This condition can lead to lack of recording performance if the magnetic spacing between the recording transducer and disk increases, and in some cases can also cause head crashes.

Figure 10:
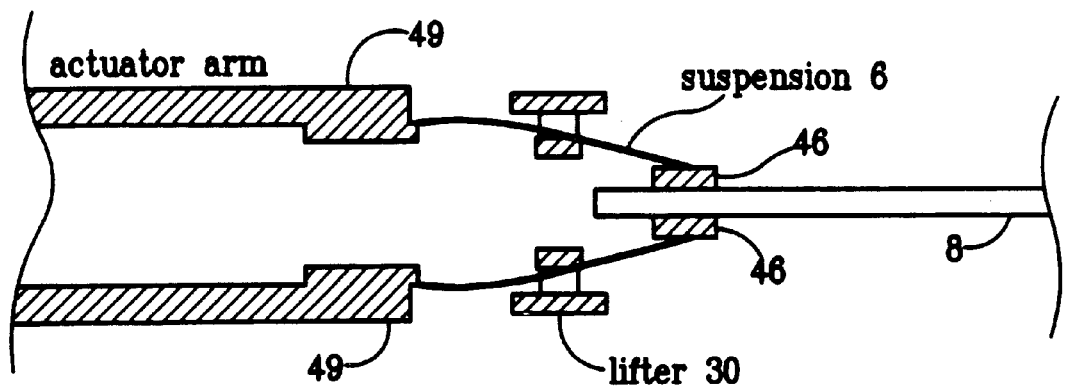
FIG. 10 is a side view of the lifter device of FIG. 6 showing the position of lifters that have been moved up the suspensions away from the heads.

An additional advantage of this invention is that the lifters 30 may be placed partly up the suspension 6, between the actuator arm and the recording head as shown in FIG. 10. Referring to FIG. 6, the movement of carriage assembly 40 would be in the direction of arrow 58. This provides for more mechanical clearance that is typically achieved by more traditional types of ramp devices, in which the ramp must usually be placed in close proximity to the head and the disk. FIG. 10 shows this improvement where the lifter device 2 with flat shelf section 32 has been moved up suspension 6 in a direction away from the head 46 and disk 8.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A head lifter device for carrying a read/write head of a disk drive into and out of engagement with a data storage medium comprising:

a ramp structure disposed in said drive;

a carriage assembly in sliding contact with said ramp structure between a first position and a second position, said carriage assembly including a sliding shelf portion having a flat shelf section that defines a plane that remains substantially parallel to a plane defined by a surface of said data storage medium during movement between said first position and said second position; and wherein said flat shelf section carries said read/write head from below into and out of engagement with said data storage medium such that there is minimal roll of said heads in relation to said data storage medium.

2. The head lifter device of claim 1 wherein said carriage assembly further comprises a pair of opposed sliding shelf portions disposed on opposite sides of said data storage medium, each of the sliding shelf portion having a flat shelf section that carries a corresponding read/write head from below into and out of engagement with opposing surfaces of said data storage medium such that planes defined by each of said flat shelf sections remain substantially parallel to a plane defined by said dat storage medium.

3. The head lifter device of claim 1 wherein said carriage assembly lifts a suspension of said drive to which said read/write head is connected in a direction substantially perpendicular to a plane defined by said data storage medium, and wherein said carriage assembly slides on said ramp structure thereby lifting said read/write head into or out of engagement with said disk medium with substantially no roll.

4. The head lifter device of claim 1 wherein each of said sliding shelf portions further comprises a flat shelf section proximate a first end of said sliding shelf portion, at least one pin proximate a second end, and a sliding body section that is disposed between and connects said flat shelf section to said at least one pin.

5. The head lifter device of claim 1 wherein said carriage assembly further comprises two opposed sliding shelf portions and a retention device for supporting and positioning said sliding shelf portions in sliding contact with said ramp structure.

6. The head lifter device of claim 5 wherein said retention device comprises at least one spring disposed between and connecting each of said opposed sliding shelf portions.

7. The head lifter device of claim 6 wherein said at least one spring is coupled to at least one hole in each of said sliding shelf portions, and said spring acts to support and position said identical sliding shelves portions oriented in opposite directions in sliding contact with said ramp structure, and said spring also acts to lower said sliding shelf portions down said ramp structure.

8. The head lifter device of claim 1 wherein said ramp structure further comprises:
    a body having a support leg and a ramp leg;
    a sliding shelf ramp disposed on said ramp leg, said sliding shelf ramp in sliding contact with said sliding shelf portion; and
    a closer pin ramp disposed on said ramp leg, said closer pin ramp in sliding contact with said pin of said sliding shelf portion.

9. The head lifter device of claim 8 wherein said closer pin ramp defines a plane that is substantially parallel to a plane defined by said sliding shelf ramp.

10. The head lifter device of claim 8 wherein said ramp structure further comprises a pair of opposing sliding shelf ramps and a pair of opposing closer pin ramps.

11. The head lifter device of claim 1 wherein said ramp structure further comprises:
    an inverted L-shaped body having a support leg member that is attached to an inside floor of a disk drive enclosure and a lifting ramp having two sets of substantially coplanar opposing ramps;
    said lifting ramp further comprising:
        a central section having a distal end and two sides;
        two opposed sliding shelf ramps formed on said central section, said sliding shelf ramps having a bottom at said distal end of said central section and a top;
        a crevice, said crevice being located in a center portion of said central section such that said crevice vertically divides a portion of said central section and said sliding shelf ramps from said distal end to a point pass said top of said sliding shelf ramps, and said crevice being open at said distal end of said central section; and
        two side plates having opposed closer pin ramps disposed on each side of said central section.

12. The head lifter device of claim 1 wherein said sliding shelf portion further comprises a recess that engages a stop disposed at a bottom of said ramp structure to limit the travel of said sliding shelf portion in a direction toward said bottom of said ramp structure.

13. A system for lifting a read/write head of a disk drive onto and off of a data storage medium, said system comprising:
    a disk drive enclosure;
    an actuator disposed in said disk drive having an actuator arm, a suspension coupled to said actuator arm, and a read/write head coupled to said suspension; and
    a head lifter device for carrying said read/write head of said disk drive into and out of engagement with said data storage medium such that there is minimal roll of said heads in relation to said data storage medium;
    wherein said head lifter device further comprises:
        a ramp structure disposed in said drive; and
        a carriage assembly in sliding contact with said ramp structure between a first position and a second position, said carriage assembly including a sliding shelf portion having a flat shelf section that defines a plane that remains substantially parallel to a plane defined by a surface of said data storage medium during said movement between said first position and said second position.

14. The system of claim 13 wherein said carriage assembly lifts said suspension of said drive in a direction substantially perpendicular to a plane defined by said disk medium, and wherein said carriage assembly slides on said ramp structure thereby lifting said read/write head into or out of engagement with said disk medium with substantially no roll.

15. The system of claim 13 where said carriage assembly further comprises:
    two opposed sliding shelf portions each having a flat shelf section located at a first end, at least one pin located at a second end, and a sliding body section disposed between and connecting said flat shelf section to said at least one pin;
    at least one spring disposed between said sliding shelf portions and said ramp structure; and
    wherein said spring is coupled to at least one hole in each of said opposed sliding body section and said spring acts to position and hold said opposed sliding shelf portions in sliding contact with said lifting ramp.

16. The system of claim 13 wherein said ramp structure further comprises a lifting ramp, and said lifting ramp further comprises:
    a central section having a distal end and two sides;
    two opposed sliding shelf ramps formed on said central section at said distal end, said sliding shelf ramps having a bottom and a top;
    a crevice, said crevice being disposed proximate a center portion of said central section such that said crevice vertically divides a portion of said central section and said sliding shelf ramps from said distal end to a point pass said top of said sliding shelf ramps, and said crevice being open at said distal end of said central section; and
    two side plates having opposing closer pin ramps that are substantially in parallel planes with said slider shelf ramps and located on each side of said central section.

17. The system of claim 13 wherein said head lifter device is placed partly up said suspension away from said read/write head, between said actuator arm and said recording head slider.

18. The system of claim 13 wherein said sliding shelf portion further comprises a recess that engages a stop disposed at a bottom of said ramp structure to limit the travel of said sliding shelf portion in a direction toward said bottom of said ramp structure.

19. A system for carrying one or more read/write heads of a disk drive into or out of engagement with a data storage medium, said system comprising:
    a disk drive;
    an actuator disposed in said disk drive having an actuator arm, a suspension coupled to said actuator arm, and a read/write head coupled to said suspension;
    a head lifter device having a carriage assembly and a ramp structure;

wherein said ramp structure further comprises a body having a support leg member that is attached to an inside floor of said disk drive enclosure, and a lifting ramp having two sets of opposing ramps;

wherein said carriage assembly further comprises two opposed sliding shelf portions, and a retention device for supporting and positioning said sliding shelf portions in sliding contact with said ramp structure;

wherein said carriage assembly is in sliding contact with said lifting ramp; and wherein said one or more read/write heads are carried out of engagement with said data storage medium by said sliding shelf portion lifting said suspension from below as said actuator arm pushes said sliding shelf portion up said lifting ramp, and said one or more read/write heads are carried into engagement with said data storage medium by said sliding shelf portion lowering said suspension of said actuator arm as said suspension moves toward said disk and said retention device pulls said opposing sliding shelf portions down said lifting ramp.

20. A method for carrying one or more read/write heads of a disk drive into or out of engagement with a data storage medium, comprising the steps of:

providing one or more disk drive actuators disposed in said disk drive, said one or more actuators each having an actuator arm, a suspension coupled to said actuator arm, and a read/write head coupled to said suspension;

disposing a ramp structure proximate said suspension;

placing a carriage assembly including a sliding shelf portion having a flat shelf section in sliding contact with said ramp structure; and carrying said suspension with said flat shelf section into and out of engagement with said data storage medium such that a plane defined by said flat shelf section remains substantially parallel to a plane defined by said data storage medium.

21. The method of claim 20 wherein said step of placing said carriage assembly in sliding contact with said ramp structure further comprises:

placing a sliding shelf portion of said carriage assembly in sliding contact with a lifting ramp on said ramp structure;

placing at least one pin on said sliding shelf portion in sliding contact with a closer pin ramp on said ramp structure; and supporting and positioning said sliding shelf portion in sliding contact with said lifting ramp and said closer pin ramp by use of at least one spring.

22. The method of claim 20 wherein said step of carrying said suspension further comprises:

lifting said read/write heads out of engagement with said data storage medium with said flat shelf section of said sliding shelf portion, and lifting said suspensions up said lifter ramp by said actuator arm pushing against said carriage assembly to move said carriage assembly from a bottom to a top of said lifting ramp and said closer pin ramp, and where as said suspension push said carriage assembly up said ramps, a spring stretches; and lowering said read/write heads down said ramps by removing the force of said actuator arm, and said spring contracting and allowing said carriage assembly to follow said suspensions back down said ramps, and loading said read/write heads back onto engagement with said data storage medium.

* * * * *

UNITED STATES PATENT AND TRADEMARK OFFICE
CERTIFICATE OF CORRECTION

PATENT NO.      : 6,424,502 B1                                    Page 1 of 1
DATED           : July 23, 2002
INVENTOR(S)     : Stephen Scott Murray It is certified that error appears in the above-identified patent and that said Letters Patent is hereby corrected as shown below:

Column 10,
Line 53, "dat" should be -- data --

Signed and Sealed this

Fourth Day of February, 2003

JAMES E. ROGAN
*Director of the United States Patent and Trademark Office*